May 21, 1968 R. LINNEMANN 3,383,824
DEVICE FOR INSTALLING OR REPLACING
THE LINING OF ROTARY KILNS
Filed Dec. 15, 1965 6 Sheets-Sheet 1
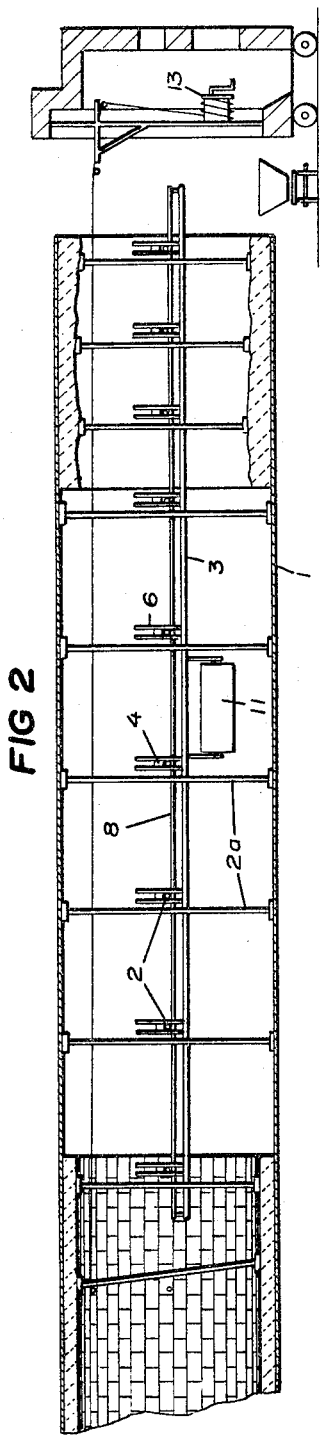
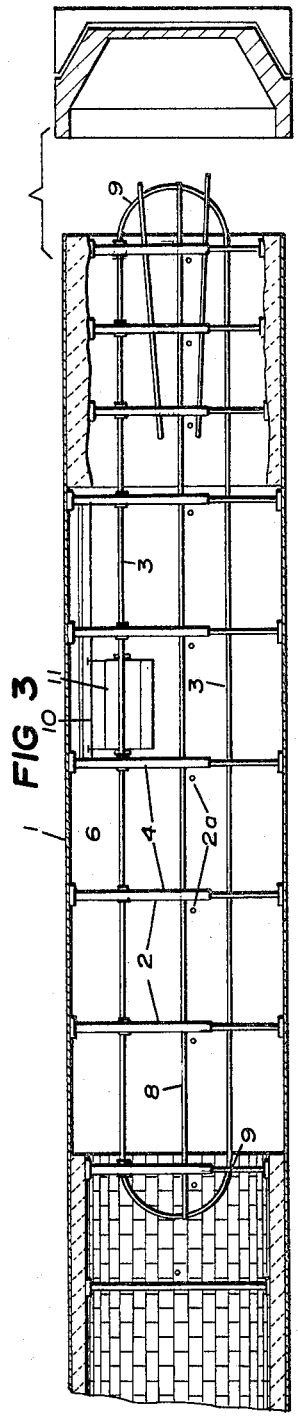
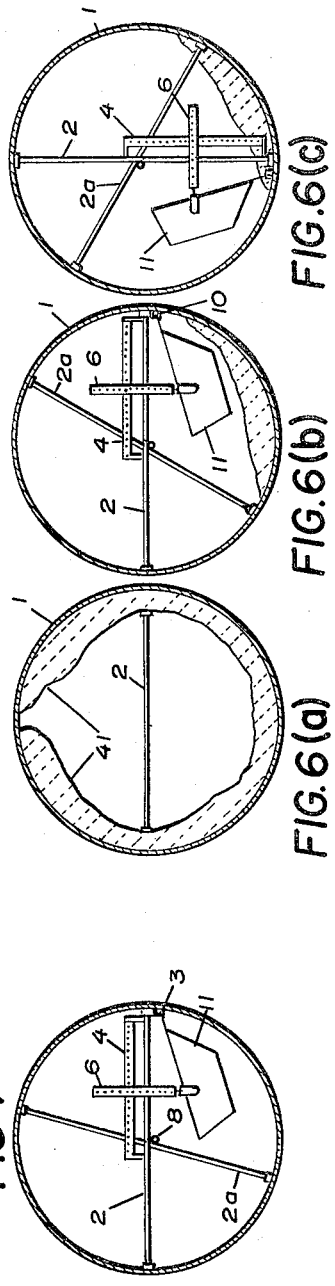
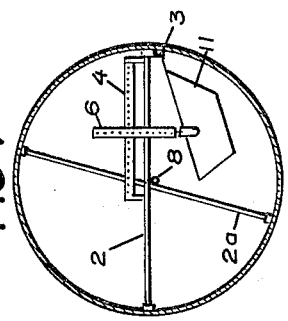
INVENTOR.
Rolf Linnemann
BY
*Wenderoth, Lind & Ponack*
ATTORNEYS INVENTOR.
Rolf Linnemann
BY
Wenderoth, Lind & Ponack
ATTORNEYS INVENTOR.
BY *Rolf Linnemann*

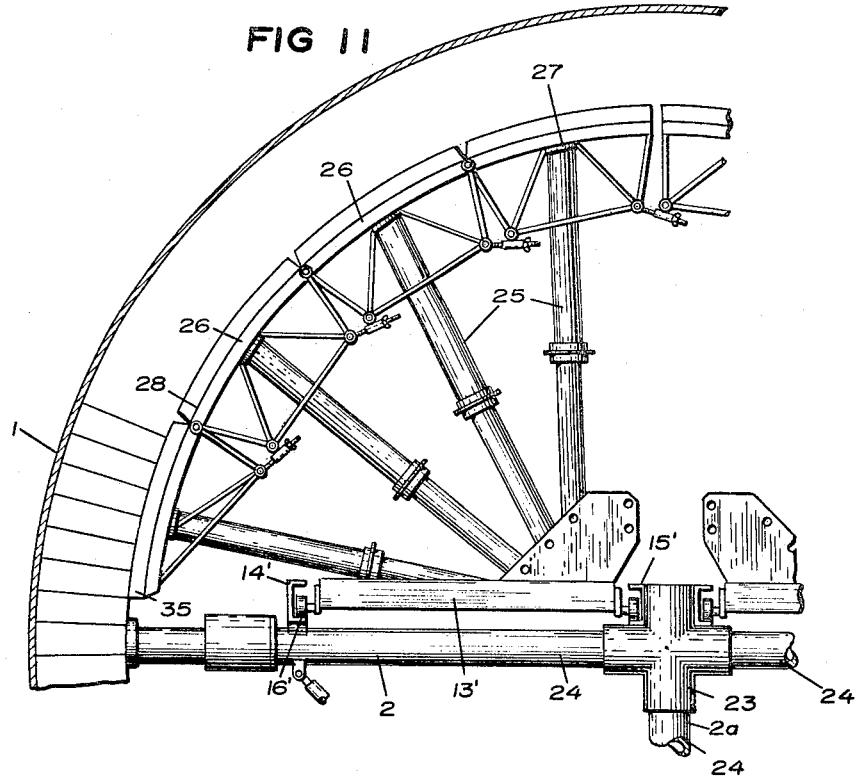
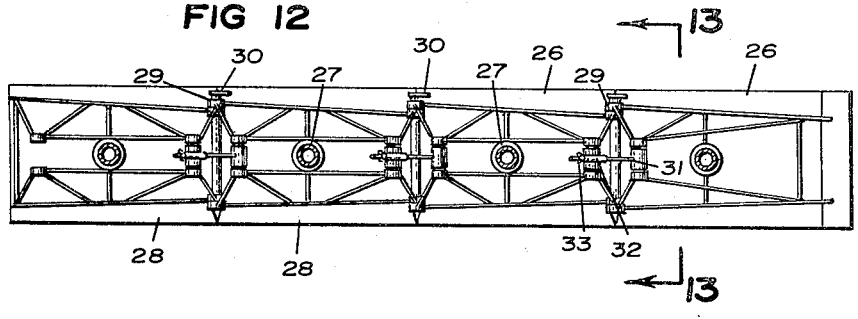

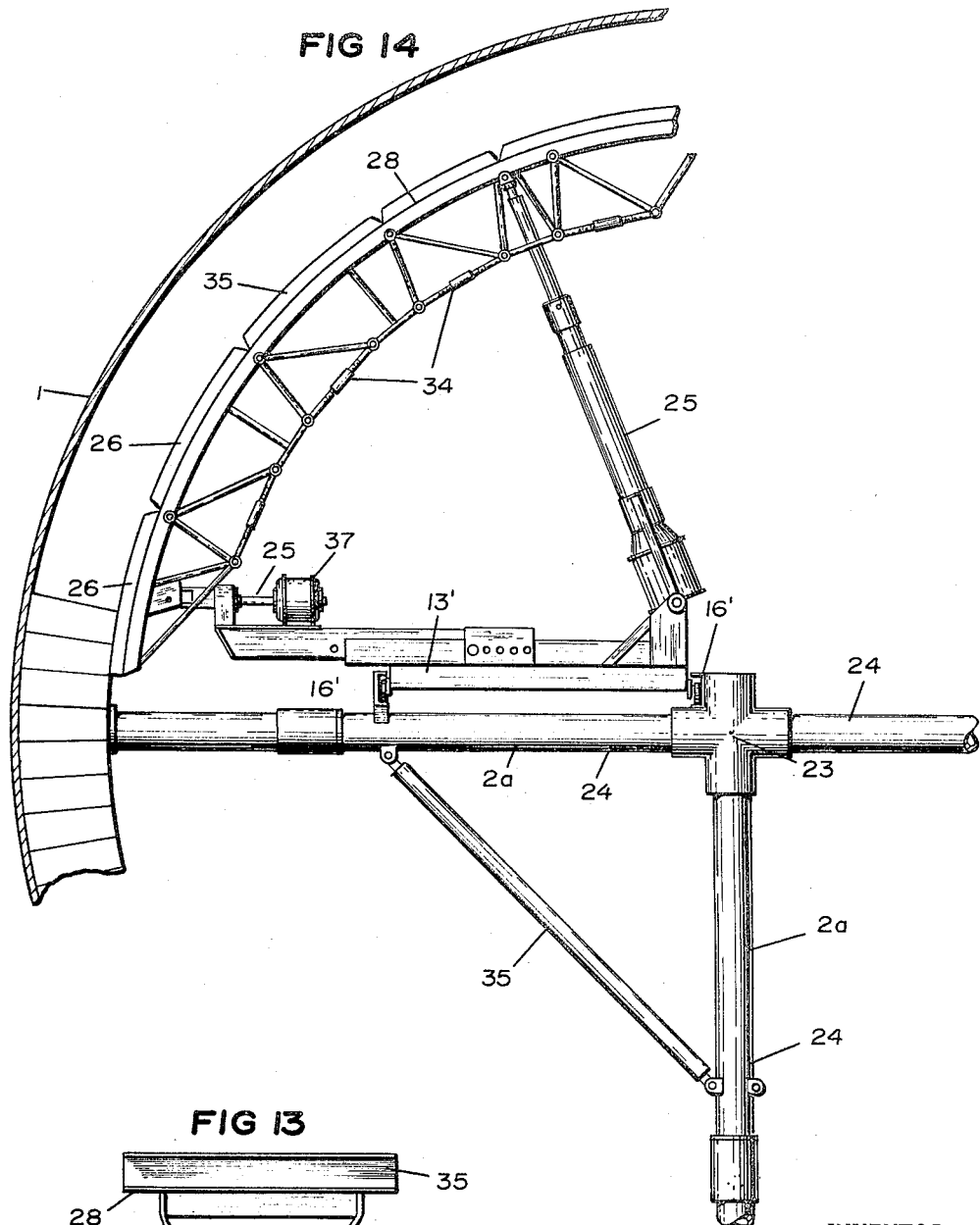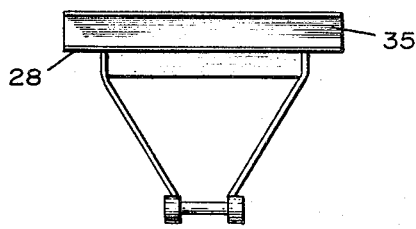

United States Patent Office 3,383,824
Patented May 21, 1968

3,383,824
DEVICE FOR INSTALLING OR REPLACING THE LINING OF ROTARY KILNS
Rolf Linnemann, Singen, Hohentwiel, Germany, assignor to Didier-Werke AG., Wiesbaden, Germany
Field Dec. 15, 1965, Ser. No. 514,097
Claims priority, application Germany, Dec. 15, 1964, L 49,531; Nov. 13, 1965, D 48,645
7 Claims. (Cl. 52—749)

ABSTRACT OF THE DISCLOSURE

Means for inserting or replacing a lining in a rotary kiln wherein a plurality of telescopically diametrically extending support struts support guide rails upon which conveyor means are movable. A plurality of adjustable sheathing segments are supported from the conveying means and such segments provide a bearing surface for bricks with a curvature corresponding to the curvature of the kiln. Longitudinally adjustable supports for the sheathing segments are pivotally connected to the conveyor means.

---

The capacity of modern rotary kilns for different industrial branches, especially for the concrete, lime, dolomite and chemical industry amounts nowadays up to 1000 tons and more. The rotating tubes are dimensioned accordingly with the interior diameter extending from 3.5 to 5.5 meters. Such large kilns require for the removal of damaged brick linings as well as for a new lining an enormous amount of material, working hours and time. Also, the danger of accidents is especially high when the work for the relining, as it has been accomplished thus far, begins at the lower semi-circle of the cross section of the rotating tube.

According to usual working methods, one uses simple means of conveying, as wheelbarrows or lorries which run on rails and which are loaded manually. The brick lining is transported out partly by rotating the cooled rotating tube for hours. It is well known that considerable damage occurs thereby because of the loosening of the remaining lining, especially since the obtaining of a tight fitting of the brick lining in rotary kilns with a larger diameter poses problems and is very expensive.

An object of the present invention is to provide means and a process whereby the lining of new rotary kilns as well as the removal and replacing of a damaged brick lining of a rotary kiln is simpler, faster and more secure and can be accomplished with a smaller labor force. It is especially applicable for rotary kilns with a diameter of more than three meters in which said advantages are most effective.

An object of the invention is to provide a device comprising one or several guide rails extending into the kiln on which conveying means are operated. It is characterized in that the guide rails are fastened to support struts which are placed diametrally in the kiln and are telescopical extensible. By the aid of such struts the corresponding methods can be accomplished in a more rational and therefore more economical way contrary to the hitherto known procedures. Simultaneously, the danger of accidents is diminished. The reduction of time and labor force obtained when using the inventive device also necessitates a shortened operational stoppage which is especially effective in economical respects for modern large rotary kilns having a capacity around 1000 tons.

A further object is to provide an economical and secure removal of sediment rings which form during the production process within the rotary kiln following the highly strained zones and effect an undesired narrowing of the cross section. They can only be removed during the inoperativeness of the kiln in a cold condition, whereby they are very hard so that for their loosening and removal chemical means have to be applied.

When lining rotary kilns, as is known, the lining which is not yet finished is supported by support struts so that it may not fall off during the rotating of the kiln for the purpose of lining a further part of the circumference. According to this invention, the same support struts are used for the support of the installed lining for the installation of the guide rails on which the conveying means, for instance, buckets for the bringing in of the bricks for the lining, are movable. For the breaking off of old linings on the same device special conveying means are used for transporting the furnace lining away.

The guide rails may be suspended from horizontally installed support struts so that the conveying devices are also manageable in a suspended condition. Thereby, by the installation of an articulation piece, the guide rails have to be arranged swinging, e.g. being transversely swingable towards the kiln, so that the conveying device may be managed also during a rotating of the kiln from its original position. This also facilitates simplifying the loading of the conveyor buckets with the brick lining. For this purpose, for instance, the conveyor buckets are adjustable with an upper edge on a tie beam which abuts the interior of the kiln along the kiln lining and is fastened to the support struts. By a single rotating of the kiln the broken out lining falls into the conveyor buckets fastened to the tie beam.

The guide rails may also be placed on the horizontally installed support struts. Also, a lateral guide rail is provided on the same support struts vertically to the horizontally installed support struts. The triangular arrangement of the run and guide rails obtained in this way prevents a falling off of the conveying device during the rotating of the rotating tube and at the same time permits a moving of the conveying device in any desirable position of the rotating tube.

When operating with the device during the breaking off of the worn out lining as well as during the installing of a new lining the rotary kiln has to be rotated, which is not always desirable for rotary kilns of a very large diameter because of the thereby caused changes in form of the same, a still further object is to provide a further embodiment to make it possible to accomplish the breaking off of the worn lining as well as also the renewal of the lining and a new installing of the lining of the rotary kiln without the required rotating of the rotating tube during the work.

A further object of the present invention consists in that for each of the two upper sectors, by the vertically to each other arranged rows forming support struts within the rotary kiln one conveyor cart each on guide rails is provided whereby each serves as a support for a plurality of adjustable and lockable sheathing segments, articulated and disconnectable with each other, with a quarter arch being formed as a safety cinch as a supporting surface having a curvature corresponding to the cross section of the kiln and each of the sheathing segments of the quarter arch is articulated by longitudinally adjustable supports to the pertaining conveyor cart and is kept in the appropriately adjusted position.

Because of the adjustment and by means of the corresponding fixing of the sheathing segments, the quarter arches can be adapted within a considerable range to different diameters of the rotating tube, so that it is not necessary to use for each diameter of rotating tube correspondingly fitting sheathing segments.

A further object is to connect the articulated sheathing segments at their lower side with each other by turnbuckles to a quarter arch. Thereby, not only a serial arrangement of the sheathing segments to a rigid quarter arch is possible but also to a certain extent a change of the radius of the quarter arch is possible.

A further advantageous embodiment consists in that in rigidly connected sheathing segments for instance, secured with turnbuckles to a quarter arch two individually adjustable supports are provided, for instance hydraulically driven, wherein one engages in about the horizontal direction with the lower sheathing segment and the other at the upper sheathing segment of the quarter arch. This embodiment provides for a simplified lowering and raising of each quarter arch which facilitates in a simple way the necessary moving of the quarter arch during the progressing work and a pressing of the corresponding layer of bricks to the furnace shell.

In order to facilitate that the quarter arches can be adapted for a larger range to the respective diameters of the rotary kiln, sheathing segments of different lengths may be put together for forming the quarter arches.

For the compensation of tolerances which are caused by the rigid quarter arches at different diameter adjustments, the safety cinch of the sheathing segments is coated at its upper side with an elastic material, for instance a strong cellular plastic which is provided with an elastic synthetic coating at its upper side.

A still further object is to provide for the mounting of the guide rails in the upper sectors instead of simple support struts to use such which have arm pieces held together by a center cross piece and which are telescopically extensible and which have a support strut cross. By such a form of support strut a provision is possible for an upper half within the rotary kiln being free from struts and to remove the upper arm of each strut within the respective operating range from the cross piece.

With the above and other objects in view which will become apparent from the detailed description below, some preferred embodiments of the invention are shown in the drawings in which:

FIGURE 1 is a cross-sectional view through a rotary kiln showing the device installed therein;

FIGURE 2 is a vertical longitudinal sectional diagrammatic view through a rotary kiln with the device installed therein;

FIGURE 3 is a horizontal longitudinal diagrammatic sectional view through a rotary kiln with the device installed therein;

FIGURE 6 shows three cross-sectional views a, b, and c, illustrating the process for the clearing of the lining in diagrammatic cross section at different times by means of the construction shown in FIGURES 1 to 5;

FIGURE 11 is a partial front elevational diagrammatic view showing a conveyor cart in operating position with a quarter arch arranged on the same with individually supported sheathing segments;

FIGURE 12 is a bottom view shown diagrammatically of the quarter arch illustrated in FIGURE 11;

FIGURE 13 is a cross-sectional view taken upon section line 13—13 of FIGURE 12 and FIGURE 14 illustrates partially a conveyor cart in operating position with a quarter arch arranged thereon having turnbuckle bracing and supported by two supports.

Figure 4:
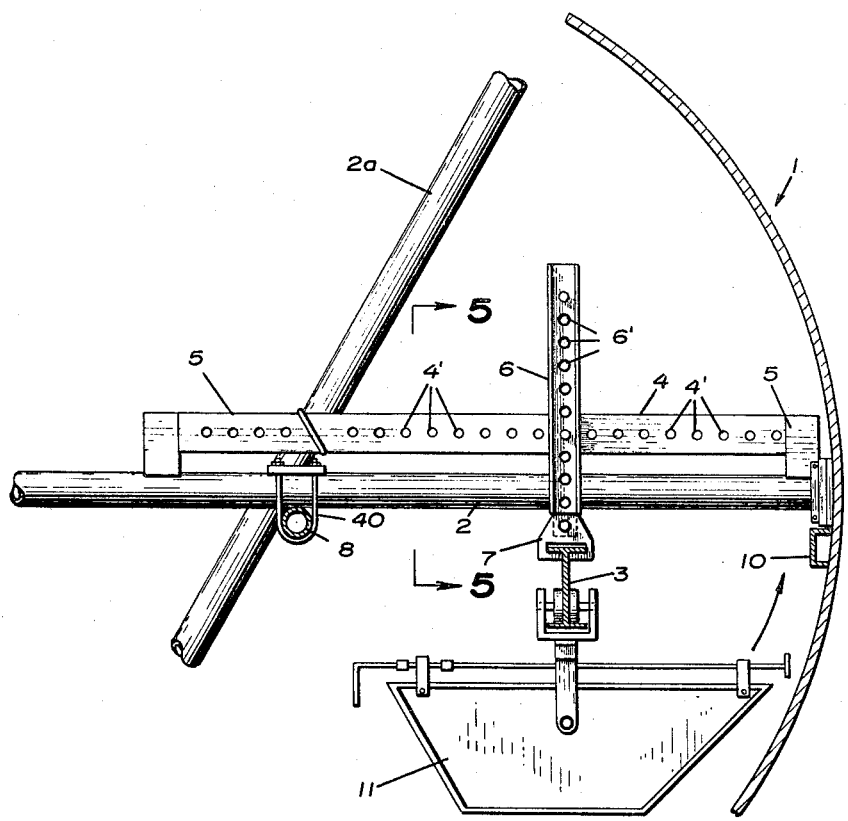
FIGURE 4 is a partial elevational view from the front of the rotary kiln.
Figure 5:
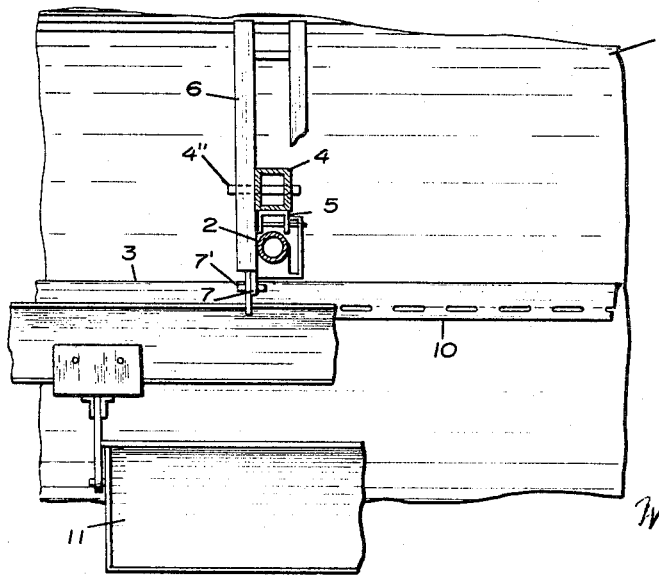
FIGURE 5 is a partial side view of the device in the rotary kiln.

The essential parts of the device to be installed into the rotary kiln 1 are support struts 2 and 2a and the guide rails 3, being fastened to the same. FIGS. 1 to 6 show an embodiment with suspended rails. One rail may be installed along the longitudinal side of the furnace or one rail each at both sides of the center line of the furnace, whereby in the latter case the two rails may be connected at their ends by rail arches, so that the conveyor device may operate in a rotary way.

The suspension of the guide rail 3 is accomplished preferably by means of supports 4 (FIGS. 4 and 5) which may be hollow supports or U-shaped supports and which are fastened via support blocks 5 on horizontal support struts installed in the rotary kiln and parallel to the same. The support 4 is perforated at 4'. A holding rail 6 which is perforated at 6' is suspended from support 4 by means of plug bolts 4". The guide rail 3 is arranged oscillating via a hinged piece 7 on pin 7' at the lower end of the holding rail.

The perforated supports 4 permit a simple suspension of the guide rail 3 in any desired position which depends on the diameter of the furnace and distributes the load over a larger length of the support strut.

Support struts 2a are arranged in a vertical direction and are connected with the horizontal struts 2 via clamp hooks. A supporting pipe 8 is also fastened by clamp hooks 40 to the vertical and horizontal support struts preferably at their crossing point and in the center line of the kiln. It serves for the cross and longitudinal bracing of the entire device and as support for the rail arches 9, which in the case of a double rail device connects the two guide rails with each other. It also facilitates the moving of the support struts with the other parts during the course of the progressing work. The hooks have to be loosened only, whereupon the struts suspending from the support pipe may be moved.

Within the range of the removed lining at the ends of the struts 2 bearing the guide rails 3, anchor rails 10 are fastened to the furance shell in a longitudinal direction. They serve to hold the conveyor buckets 11 during the filling of the same by rotating the rotating tube.

For lining a new rotary kiln, first of all, support struts 2 are installed at regular intervals of about 2 to 3 meters in a horizontal direction and guide rails 3 are suspended from the same on which the conveyor device delivers the bricks for the lining into the kiln. The conveying is either accomplished on one rail or on two rails left or right of the kiln axis in a shuttle or circular traffic. Thereby the bricks are served simultaneously on both sides for installation at very short distances. After the bricks have been installed at the lower part of the furnace, between the support struts 2 which carry the guide rails additional oblique and/or vertically standing struts are installed for the support of the lining, the support pipe 8 is installed and the horizontal support struts put on the lining. Then the kiln is rotated and a further part of the circumference is lined. Since the guide rail is suspended oscillating it can also be used, after the rotation for severing further bricks which are necessary for the lining. In this way the kiln is lined step by step in lengths of about 5 meters from the interior towards the exterior.

For breaking out a damaged lining and renewing the same, the support struts are inserted in the same way in a horizontal direction in the rotary kiln and a guide rail is suspended therefrom. The support struts also serve for supporting a scaffold from which the breaking out of the lining or of the sediment rings 41 in the upper apex of the kiln starts (FIG. 6a). Thereby the danger of accidents is diminished. Namely, if one starts with the breaking out below at the base, then the danger arises that the upper part of the lining may loosen too early and drop down.

For instance behind the zone to be repaired in the direction of the inflow, a support strut 12 is installed and a cable which extends to a cable winch 13 outside of the furnace is fastened to the same. From this cable a compressed air gun is fasteneed with which the work of breaking out the lining at the top is started. It also serves for conveying and installing the other support struts. The installation of the horizontal support struts is accomplished from the outflow for instance each 2.5 meter. After the removal of a part of the upper half of the rotary kiln from the scaffold being supported by the support struts, the further installation of the horizontal support struts is accomplished which are then directly placed on the furnace shell. The loosening of the lining in the lower part of the furnace is accomplished by rotating which is easily possible since a bracing does not exist.

If the removed lining is at the furnace bottom, vertical or oblique struts 2a, support pipe 8 and guide rails 3 are installed and several conveyor buckets 11 (FIG. 6b). The latter are fastened to the guide rail 10. By a rotation of the furnace the buckets are filled (FIG. 6c) with the loosened material which rolls into the same and after detaching the guide rail may be brought out. This process is repeated until all of the material of the lining is removed.

In this way the removal of the lining is accomplished stey by step by the use of further support struts and extending of the guide rails. The renewal of the lining is done in the same way as the installing of a new lining into the rotary kiln.

Figure 7:
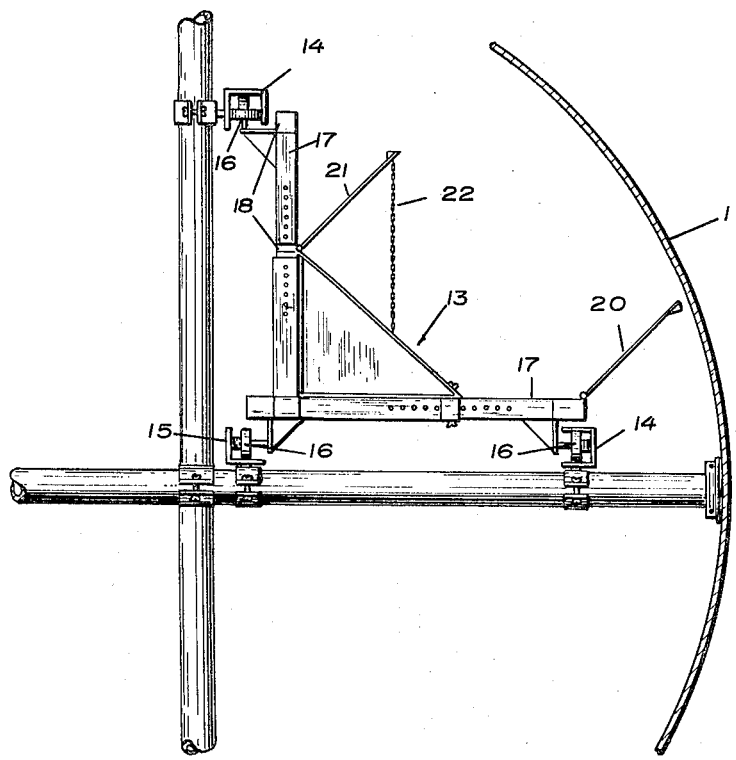
FIGURE 7 is a partial elevational view from the front end of a rotary kiln illustrating a modified construction.
Figure 8:
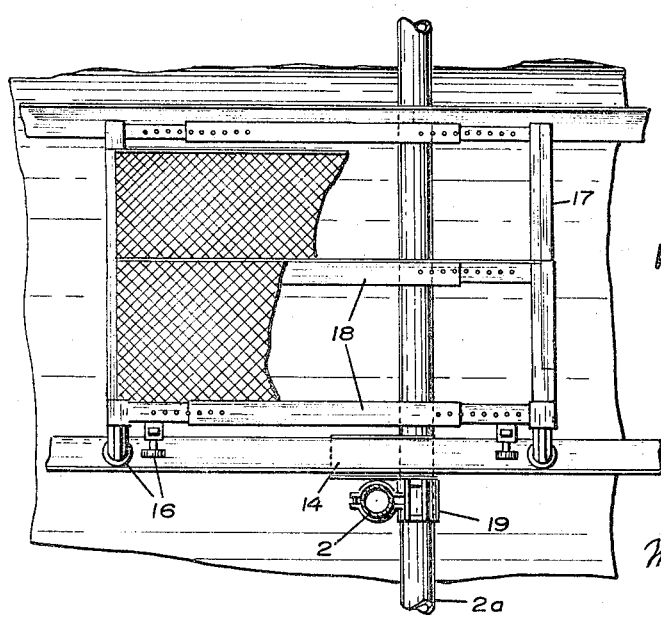
FIGURE 8 is a partial side view of the modification illustrated in FIGURE 7.

FIGS. 7 and 8 illustrate an especially advantageous device in which the guide rails are directly fastened to support struts 2 and 2a. Thereby the support struts are installed in pairs vertically on top of each other and the conveyor cart 13 moves in a quadrant being formed by the strut crosses, whereby on each cross arm a rail 14 and at the horizontal cross arm close to the crossing point a rail 15 is fastened. The rails 14 have a U shape and the rails 15 an L-shaped cross section. In said rails run roller pairs 16 of the conveyor cart 13, whereby the axes of a pair of rollers are vertical to one another at the top and bottom. This embodiment facilitates that the conveyor cart can be moved to any position which is necessitated by the rotation of the rotating tube. A falling out of the cart is prevented by the triangular arrangement of the guide rails and the U-shaped rails 14.

The two support struts stand vertically superimposed and are connected with each other at their crossing point by rotary clamp hooks 19. Rails 14 are spaced about 40 to 50 centimeters from the end of the strut and are fastened by means of clamp hooks and clamping shoes to the support struts.

The conveyor cart 13 is preferably constructed of replaceable individual parts and is adapted in its cross section to the rectangular circular sector. The front sides of the cart are formed by two cross supports 17 which stand vertically superimposed at their ends and a front plate which is put onto the same. They are connected by a longitudinal girder 18 onto which side sheets are put. Rollers 16 are fastened to the cross supports 17. The longitudinal and cross supports consist preferably of two fixable girder sections longitudinally movable against each other, for instance by plug bolts, so that the size of the cart may be adapted to the diameter of the rotating tube and the distance of the guide rails 14 and 15.

For assembling the conveyor carts the cross supports standing superimposed vertically are installed with the guide rails and the distance of the roller is adjusted to the gauge of the guide rails, which is accomplished by moving the girder sections of the cross supports 17. Then the cross supports are connected with the longtiudinal girder and the front and side sheets are installed.

Figure 9A:
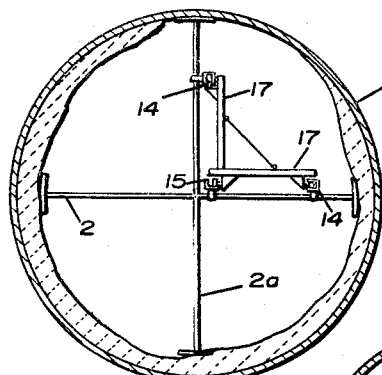
FIGURE 9 is a diagrammatic view showing the progress of the work in breaking off at three different time periods illustrated in the diagrammatic views a, b and c.
Figure 9B:
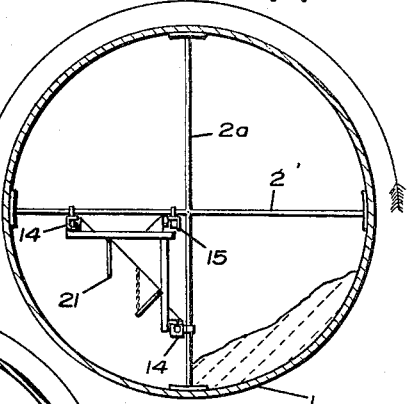
Figure 9C:
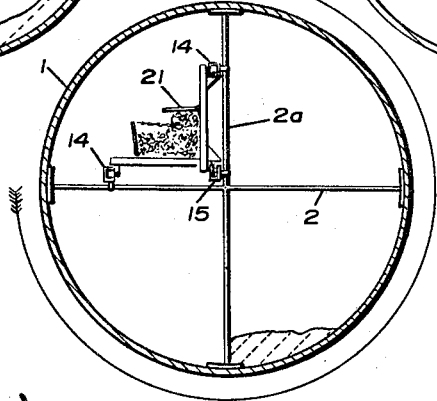

Said conveyor cart may also be filled by rotation of the rotating tube with the broken off material (FIG. 9). For this purpose the size of the cart has to be so dimensioned that the supports 17 and the side sheets do not extend to the furnace shell 1. At the longitudinal side of the horizontal side of the cart a catch flap 20 is pivotally arranged. If, when rotating the rotating tube 1 the cart 13 moves to the lower half of the rotation tube (FIG. 9b), the material which has been broken off rolls into the same and is carried away by the catch flap which leans against the furnace shell. For large amounts of material the entry into the cart is made easier, when the sheet of the vertical side wall extends only up to about half of the cross supports 17 and there within the interior of the cart a locking flap 21 is pivotally arranged, which when rotating the rotating tube 1 first of all yields to the material rolling into the cart and then serves as an additional side wall (FIG. 9c). In order that in this position of the cart the locking flap 21 does not fall out, it is retained, for instance, on both front sides by a chain 22.

In order to empty the conveyor cart, the same is moved out of the kiln on the guide rails which protrude out of the kiln and is tilted by the rotation of the rotating tube.

Figure 10A:
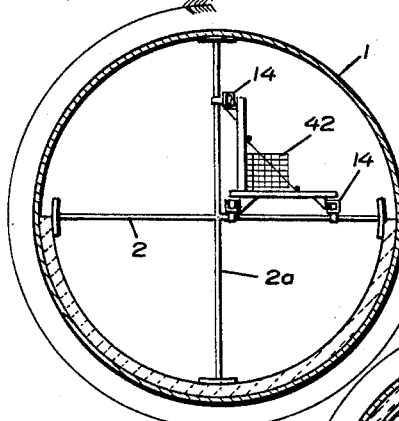
FIGURE 10 is a similar view illustrating the building up of the lining bricks at different periods as shown in diagrammatic views a, b and c by means of the devices shown in FIGURES 7 and 8.
Figure 10B:
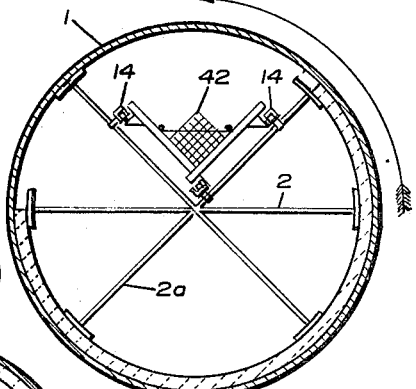
Figure 10C:
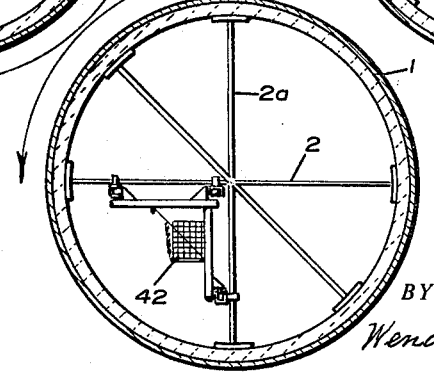

The conveyor cart may also be used as scaffold for the breaking out of the lining which, as has been described above, should preferably start at the apex. For this purpose below the bottom of the conveyor cart an extensible platform may be arranged in order to have a larger working area from one position of the conveyor cart. The same conveyor cart also serves for supplying the material for a new lining. The position of the conveyor cart within the upper semi-circle of the rotating tube facilitates that the individual bricks are conveyed on following chutes in a simple and convenient way to the working place in the lower semi circle. Hereby the path of work during the walling up is essentially shortened. The brick lining is accomplished in the same way as described above. The conveyor cart may be used in any position of the rotary kiln for the bringing in of bricks 42 (FIG. 10).

A further advantageous embodiment of the device and its application are shown in FIGURES 11 to 14.

Within the rotary kiln 1, the telescopic extensible support struts 2 and 2a, forming a cross, are arranged in rows in series. The support struts 2 and 2a consist of a center cross piece 23, into which the telescopic extensible arm pieces 24 are installed to form a support strut cross. The arm pieces 24 of the horizontal support struts 2 support the guide rails 14' and 15', in which rollers 16' of the conveyor cart 13' are guided. On conveyor cart 13' supports 25 are arranged which are longitudinally adjustable. The supports 25 are swingable and removable on a fixed trestle. The free ends of the support 25 are pivoted to the sheathing segments 26. For this purpose the free ends of the supports 25 for instance may be formed as spherical end pieces which engage in a socket 27 arranged on the sheathing element 26. The sheathing segments 26 are provided with a safety cinch 28 which serves as a bearing surface and a plurality of the same is assembled pivoted to a quarter arch. For this purpose the sheathing segments 26 are provided with corresponding bearings 29. The connection between two adjacent sheathing elements 26 is accomplished accordingly by a plug bolt 30. In order to adjust the sheathing segments against each other, one end of them bear swingable screw bolts 31 which engage into a sleeve 32 arranged at the next following sheathing segment 26 and are braced by means of a wing nut 33, so that an adjustment of the supports 25 and after tightening of the wing nut 33 a rigid structure is formed which consists of a conveyor cart 13', the strut 25 and the arch parts 26 forming a quarter arch, said structure bearing on guide rails 14' and 15'. Because of the articulated, adjustable and fixable connection of said parts between each other it is possible to adjust the quarter arch to different diameters of the furnace.

A lining with a device according to the above structure is accomplished as follows:

After erecting the support strut crosses within the rotary kiln 1, by which the cross section is divided into four sectors, the guide rails 14' and 15' are arranged in the two upper sectors and are fastened on the horizontal arm pieces. Now the brick lining of the two lower sectors of the rotary kiln may be accomplished. Following this the quarter arches are mounted on the conveyor cart 13' and adjusted according to the curvature of the tube of the roarty kiln. Then, the conveyor cart 13' is moved into the rotary tube and is fixed. Then the brick lining of two semi rings each is accomplished by placing the bricks on the safety cinches 28 of the quarter arches. Thereupon the pressing on of the brick lining to the furnace shell is done by means of supports 25. After the vertex has been wedged and the brick ring closed by means of adapting bricks or the like, the quarter arches are lowered by means of supports 25 and are moved correspondingly with the conveyor cart 13' for the placing of the next ring of bricks.

This above described method is accomplished for dry brick lining, while for a lining with plaster the lining and pressing on is accomplished alternating in sections. The sheathing segments 26 of the quarter arches then serve as self-supporting sheathing during the setting time of the plaster.

The operation for repair work in rotary kilns with the device according to the preesnt invention, for instance, is as follows:

By means of the quarter arches 3 which are adjusted in the above described way and are put into the rotary tube of the kiln, the damaged brick lining and the lining to be replaced is removed in both upper sectors. The quarter arches thereby serve as protective casing in order to protect the laborers from pieces of the lining which may be falling off. After the brick lining has been accomplished, the quarter arches are used in the above mentioned way for the renewal of the lining. After the lining has been renewed in the two upper sectors, the rotary kiln is rotated for 180 degrees and after correspondingly reinstalling the support struts 2 and 2a and the guide rails 14' and 15' the breaking out of the lining and the renewal of the same is repeated in the above mentioned way. The broken off material remains in the rotary kiln until the work has been completed. Only when the rotary kiln is in operation again and the entire lining has warmed up, then the broken off material is turned out.

According to an embodiment of FIG. 14 the sheathing segments 26 are braced together by means of turnbuckles 34. Thereby rigid quarter arches are formed which may be in an especially simple way lowered or raised by means of two supports 25 which engage on their end parts. Said lifting or lowering may be accomplished for instance hydraulically or by compressed air, whereby the horizontal drive 37 for instance may bear slidable in a horizontal direction on the conveyor cart 13'.

The safety cinches 28 of the sheathing segments 26 are covered at their upper side with an elastic material 35.

In order to support the horizontal arm pieces 24 against the vertical support struts 2a, special bars 36 may be provided.

The lifting- and lowering movement of the supports 25 on the conveyor cart 13', of course, may be accomplished in a different way, for instance the supports may be articulated to a segment which is raised or lowered by an eccentric or cam.

It is thought that the invention and its advantages will be understood from the foregoing description and it is apparent that various changes may be made in the process, form, construction and arrangement of the parts without departing from the spirit and scope of the invention or sacrificing its material advantages, the forms hereinbefore described and illustrated in the drawings being merely preferred embodiments thereof.

I claim:

1. Device for inserting or replacing a lining in a rotary kiln comprising a plurality of longitudinally spaced cross pieces in said kiln, a plurality of telescopically extensible diametrically extending support struts mounted in said cross pieces, a pair of guide rails supported upon said struts, conveyor means movable on said guide rails, a plurality of adjustable flexible and separable sheathing segments supported from said conveying means, each of said sheathing segments having a safety cinch to serve as a bearing surface for bricks with a curvature corresponding to the curvature of said kiln and longitudinally adjustable supports for said sheathing segments pivotally connected to said conveying means.

2. Device according to claim 1 wherein said sheathing segments may be connected with each other by turnbuckles.

3. Device according to claim 1 wherein driving means are provided for adjusting said longitudinally adjustable supports.

4. Device according to claim 1 wherein said sheathing segments are connected rigidly with each other to form a quarter arch and wherein two adjustable supports are provided, one of said supports engaging the lowermost sheathing segment and the other the uppermost sheathing segment of the quarter arch.

5. Device according to claim 4 wherein for forming said quarter arch sheathing segments of different lengths are joined together.

6. Device according to claim 5 wherein each safety cinch of said sheathing segments is covered at its upper part with an elastic material.

7. Device according to claim 1 wherein a telescopical extensible arm is provided to form a support strut for said diametrically extending struts.

References Cited

UNITED STATES PATENTS

| | | | |
|---|---|---|---|
| 1,304,945 | 5/1919 | Davidson | 25—131.6 |
| 2,264,054 | 11/1941 | Sarosdy | 264—32 |
| 2,486,801 | 11/1949 | Sarosdy | 214—1 X |
| 3,075,359 | 1/1963 | Clark | 52—749 |
| 3,206,824 | 9/1965 | Cerutti | 25—131.6 |
| 3,298,155 | 1/1967 | Byfield et al. | 52—749 |

ROBERT G. SHERIDAN, *Primary Examiner.*